(12) United States Patent
Nakamura et al.

(10) Patent No.: US 8,770,619 B2
(45) Date of Patent: Jul. 8, 2014

(54) HEAD PROTECTING AIRBAG DEVICE (71) Applicants: Kenji Nakamura, Tokyo (JP); Sakae Sugimori, Tokyo (JP); Hiroshi Sakamoto, Tokyo (JP)

(72) Inventors: Kenji Nakamura, Tokyo (JP); Sakae Sugimori, Tokyo (JP); Hiroshi Sakamoto, Tokyo (JP)

(73) Assignee: Takata Corporation, Tokyo (JP)

( * ) Notice: Subject to any disclaimer, the term of this patent is extended or adjusted under 35 U.S.C. 154(b) by 0 days.

(21) Appl. No.: 13/788,323

(22) Filed: Mar. 7, 2013

(65) Prior Publication Data
US 2013/0257023 A1 Oct. 3, 2013

(30) Foreign Application Priority Data

Mar. 30, 2012 (JP) ................................ 2012-079982

(51) Int. Cl.
B60R 21/201 (2011.01)
B60R 21/20 (2011.01)
B60R 21/213 (2011.01)
B60R 21/214 (2011.01)

(52) U.S. Cl.
CPC ............... B60R 21/20 (2013.01); B60R 21/213 (2013.01); B60R 21/214 (2013.01)
USPC ..................................... 280/730.2; 280/728.2

(58) Field of Classification Search
CPC .. B60R 21/201; B60R 21/213; B60R 21/214; B60R 21/2171
USPC ........................................... 280/728.2, 730.2
See application file for complete search history.

(56) References Cited

U.S. PATENT DOCUMENTS

| 6,192,554 | B1 * | 2/2001 | Dumcum ..................... 24/16 PB |
| 6,783,148 | B2 * | 8/2004 | Henderson ................. 280/728.2 |
| 6,889,999 | B2 * | 5/2005 | Dominissini et al. ...... 280/730.2 |
| 7,188,864 | B2 * | 3/2007 | Einsiedel ...................... 280/740 |
| 7,213,839 | B2 * | 5/2007 | Lockwood ................. 280/743.2 |
| 7,753,404 | B2 * | 7/2010 | Langue .......................... 280/739 |
| 7,909,358 | B2 * | 3/2011 | Kismir et al. .............. 280/730.2 |
| 8,006,999 | B2 * | 8/2011 | Suemitsu et al. ........... 280/730.2 |
| 8,505,961 | B2 * | 8/2013 | Jakobsson .................. 280/728.2 |
| 2003/0132615 | A1 * | 7/2003 | Henderson ................. 280/728.3 |
| 2005/0206135 | A1 * | 9/2005 | Nelson et al. .............. 280/728.2 |
| 2006/0244252 | A1 | 11/2006 | Kismir et al. |
| 2008/0238059 | A1 * | 10/2008 | Astrom ......................... 280/741 |
| 2011/0049848 | A1 * | 3/2011 | Walston et al. ............. 280/730.2 |
| 2012/0299276 | A1 * | 11/2012 | Hayashi et al. ............ 280/730.2 |

FOREIGN PATENT DOCUMENTS

EP 1508486 A1 * 2/2005
JP 2003-306119 A 10/2003

* cited by examiner

Primary Examiner — James English
(74) Attorney, Agent, or Firm — Fitch, Even, Tabin & Flannery, LLP (57) ABSTRACT A side airbag device incorporates an airbag which is fixed to and held by a vehicle so as to be folded in roll form, from a front portion to a rear portion of the vehicle, and which is expanded and developed like a curtain parallel with the inner surface of the side wall of the vehicle by a gas of an inflator when a collision is detected. An airbag support belt is attached to a portion, in close proximity to a top edge of the airbag and close to an attachment position of the inflator, of the airbag. The airbag support belt is wound around the circumferential surface of the inflator and a tip locking hole of the airbag support belt is fixed to a locking projection provided on the inflator, whereby the inflator is integrated with a part of the airbag which is folded in roll form.

6 Claims, 6 Drawing Sheets

HEAD PROTECTING AIRBAG DEVICE

CROSS-REFERENCE TO RELATED APPLICATION

This application claims priority under 35 U.S.C. §119 to Japanese Patent Application No. 2012-079982 filed on Mar. 30, 2012, the entire content of which is hereby incorporated herein by reference in its entirety.

BACKGROUND

1. Technical Field

The present invention relates to a head protecting airbag device. More particularly, the invention relates to a head protecting airbag device in which an airbag expands and develops like a curtain parallel with pillars and door windows arranged in each side wall of a vehicle body from its front end to its rear end between these things and a driver or a passenger when, for example, the vehicle encounters a sideways collision or turns over on its side.

2. Related Art

Among head protecting airbag devices is a device in which a side airbag expands and develops like a curtain. The side airbag is folded and housed, so as to extend in the vehicle longitudinal direction, in a cover mole which is located at the top of each side wall of the compartment so as to extend from its front end to its rear end. In a car which is equipped with this kind of head protecting airbag device, when, for example, the car encounters a sideways collision or occurrence of such an accident is predicted by activation of a collision prediction sensor (hereinafter no reference will be made of this collision prediction mechanism), the side airbag expands so as to cover the front pillar which is located at the front-right or left corner of the vehicle, the front seat window, the center pillar, the rear seat window, and the rear pillar and develops downward like a curtain between these things and a driver or a passenger. Thus, the side airbag restricts a sideways movement of the head of the driver or passenger and thereby protects the head.

This kind of head protecting airbag device is attached to a roof side rail portion of a vehicle body in a folded state. However, since the head protecting airbag device is long even in the folded state, work of attaching it takes time. And hanging-down of those portions, located between hanging points, of the folded airbag lowers the efficiency of attaching work. Furthermore, the airbag might fail to develop in a proper manner at the occurrence of a collision. In view of the above, an airbag device has bee proposed in which a folded airbag is supported by part of an inflator via a support member (JP-A-2003-306119).

SUMMARY OF THE INVENTION

The invention relates to a head protecting airbag device. The head protecting airbag device includes an airbag (i) in which plural expansive support portions are arranged from a front portion to a rear portion of a vehicle so as to communicate with each other, (ii) which is fixed to and held by a portion of a vehicle body in a folded state so as to extend along a top edge of a side wall of the vehicle and (iii) which develops like a curtain parallel with an inner surface of the side wall of the vehicle while the expansive support portions are expanded by a gas that is introduced from an inflator which operates when a collision is detected or predicted. An airbag support belt is connected to a portion, in close proximity to a top edge of the airbag and close to an attachment position of the inflator, of the airbag. The inflator is attached to the airbag in such a manner that the airbag support belt is wound around a circumferential surface of the inflator and a tip portion of the airbag support belt is fixed to the inflator to thereby cause the inflator to support a part of the airbag.

In the head protecting airbag device, the airbag support belt has an opening. The airbag support belt is wound in one or more turns around the circumferential surface of the inflator in such a manner that a tip portion of the airbag support belt passes through the opening.

In the head protecting airbag device, the inflator has a locking unit. The airbag support belt is fixed to the inflator by locking, on the locking unit, a locking hole which is formed in a tip fixing portion of the airbag support belt.

In the head protecting airbag device, a position of the opening in the airbag support belt is set according to a size of the inflator so that tension of the winding of the airbag support belt around the inflator is adjusted.

DETAILED DESCRIPTION

Head protecting airbag devices according to plural embodiments as the best mode for carrying out the invention will be hereinafter described with reference to the accompanying drawings.

[Embodiments]

Figure 1:
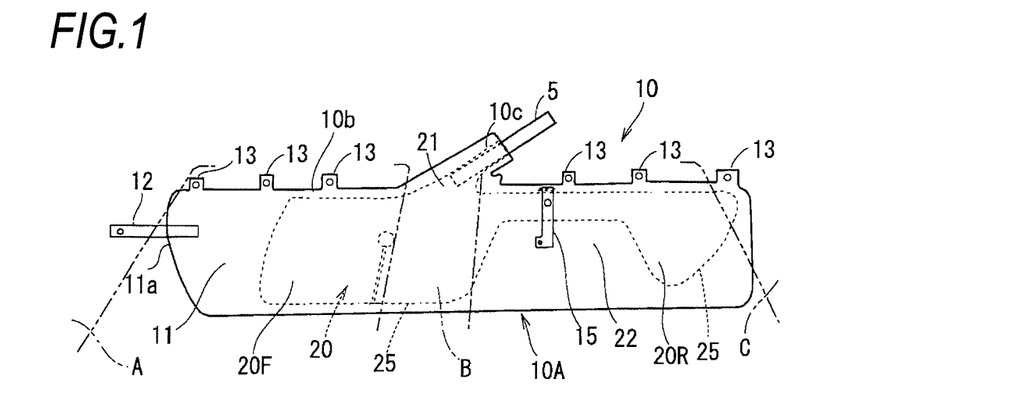
FIG. 1 is a schematic front view showing the configuration of a curtain airbag device (head protecting airbag device) according to an embodiment of the present invention.

FIG. 1 is a schematic front view a head protecting airbag device (hereinafter referred to as a curtain airbag device) 10 according to an embodiment in a state that an airbag 10A has been expanded in a prescribed manner approximately parallel with the right side wall of a vehicle and developed in a curtain-like shape. Although the curtain airbag device 10 is provided on both of the left side and the right side in the vehicle, the concept of the invention will be described below using only the curtain airbag device 10 provided on the right side.

The airbag 10A which is the main constituent member of the curtain airbag device 10 shown in FIG. 1 has approximately the same shape as airbags used in known curtain airbag devices (reference symbol 10A denotes the airbag as a whole). More specifically, the airbag 10A is formed by laying on each other and sewing together, generally alongside their outer circumferences, two pieces of base cloth having approximately the same shape that were cut out so as to extend a long distance from a front pillar A to a rear pillar C of the vehicle body in the front-rear direction. The two pieces of base cloth are sewed together to form an outer boundary line 25 which has a prescribed shape and defines an expansive support portion 20, a gas introduction passage 21, and an unexpansive portion 22. The expansive support portion 20 is divided into a front seat expansive support portion 20F and a rear seat expansive support portion 20R, and the unexpansive portion 22 is located between them.

The front seat expansive support portion 20F is defined by the outer boundary line 25 so as to completely cover a range of the slidable front seat that depends on the physique of a driver/passenger sitting there, under the gas introduction passage 21. Likewise, the rear seat expansive support portion 20R is defined by the outer boundary line 25 so as to completely cover a range of the rear seat that depends on the physique of a passenger sitting there.

The airbag 10A is also formed with a gas inlet 10c at a halfway position in the longitudinal direction in such a manner that it projects obliquely upward/rearward. An inflator 5 is connected to the gas inlet 10c. When acceleration that is higher than a threshold value is detected by a vehicular acceleration sensor (not shown) at the time of (prediction of) a sideways collision or the like, the inflator 5 produces a reaction gas explosively as a result of ignition of chemicals housed inside the inflator 5. When the gas is introduced into the airbag 10A through the gas inlet 10c, the front seat expansive support portion 20F and the rear seat expansive support portion 20R are expanded, whereby the airbag 10A pushes open a lid that covers roof side rails (not shown) and develops downward approximately at a constant speed like a curtain from the top edge of the vehicle side wall over its length in the vehicle front-rear direction.

Figure 2A:
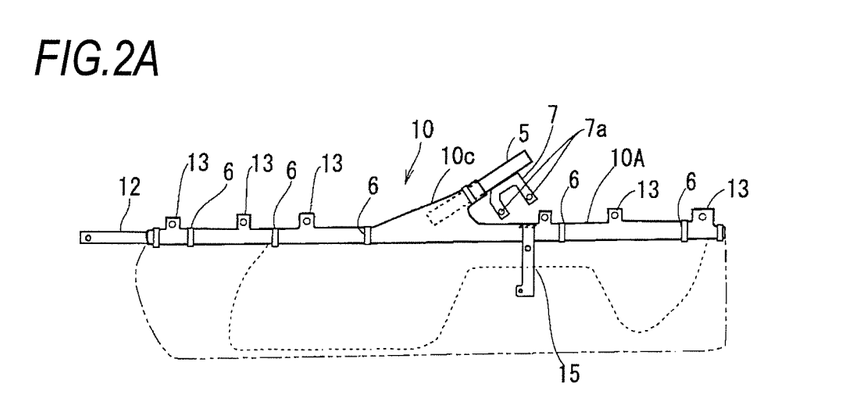
FIGS. 2A and 2B are schematic front views of the curtain airbag device in a state that an airbag shown in FIG. 1 is folded.

How the curtain airbag device 10 is attached will be described below with reference to FIGS. 2A and 2B. FIG. 2A shows a state that the airbag 10A is folded (the airbag 10A in an expanded state as shown in FIG. 1 is indicated by an imaginary line (two-dot chain line). To maintain this folded state, folding belts 6 are disposed at prescribed intervals in the longitudinal direction and wound around the airbag 10A. The folding belts 6 are thin cloth members having such strength as not to be broken usually and to be broken when they receive prescribed tension due to expansion of the airbag 10A. Although in the embodiment the airbag 10A is folded in roll form, other shapes such as a bellows band shape can be employed as long as they allow the airbag 10A to develop instantaneously when it is expanded.

As shown in FIG. 1, the curtain airbag device 10 has, as members for attaching it to the vehicle body, a front attachment belt 12 which is connected to a tip portion 11a of a tip unexpansive portion 11 and plural attachment tabs 13 which project from a top edge 10b which extends in the longitudinal direction. The front attachment belt 12 is fixed, with a bolt, to a body anchor portion (not shown) of the front pillar A. The tabs 13 are fixed to anchor portions (not shown) formed on the roof side rails (not shown) which extend in the vehicle front-rear direction between the upper ends of the front pillar A, a center pillar B, and the rear pillar C. As shown in FIG. 2B, the curtain airbag device 10 which is a long member and is attached to the vehicle body in the above-described manner is housed in the longitudinal lid (not shown) which covers the roof side rails and function, in terms of design, as a partition mole located between the ceiling and the side wall of the vehicle.

FIG. 2A shows a state before attachment of the curtain airbag device 10 to the vehicle body. In this state, the airbag 10A and the inflator 5 have not yet been integrated together by means of an airbag support belt 15. As shown in FIG. 2A, a generally inverted-U-shaped retainer 7 is attached to the inflator 5 which is connected to a top portion, located approximately at the center in the longitudinal direction, of the airbag 10A. The retainer 7 is an attachment member for attaching the inflator 5 which is relatively heavy to the vehicle body stably in attaching the curtain airbag device 10 to the vehicle body. In the embodiment, as shown in FIG. 2B, the airbag support belt 15 is used to integrate the inflator 5 with the airbag 10A in a folded state. As shown in FIG. 2B, when the inflator 5 and the airbag 10A are integrated together by means of the airbag support belt 15, attachment holes 7a of the retainer 7 are kept exposed, that is, they are not hidden behind the airbag 10A. Therefore, in attaching the curtain airbag device 10 to the vehicle body, positioning of the attachment holes 7a of the retainer 7 and work of attaching the retainer 7 can be performed easily, whereby the efficiency of the airbag attaching work can be increased greatly. Furthermore, after attachment of the inflator 5 and the curtain airbag device 10, a portion, distant from the folding belt 6, of the folded airbag 10A can be prevented from hanging down. Still further, since the inflator 5 is connected strongly to the top portion of the airbag 10A, the degree of swinging of the airbag 10A can be reduced when the inflator 5 operates and the airbag 10A is developed.

Figure 4A:
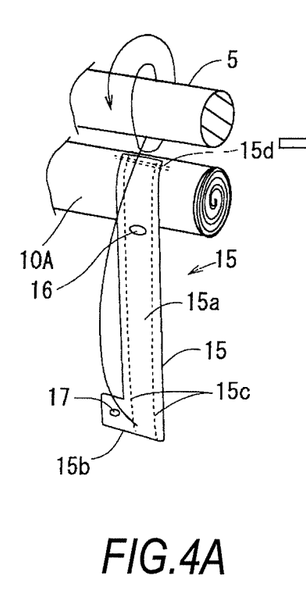
FIGS. 4A, 4B and 4C are more enlarged views showing how the airbag support belt is wound on the inflator.

The structure of the airbag support belt 15, which is an important feature of the invention, will be described below. As shown in FIGS. 1 and 2A, the airbag support belt 15 used in the embodiment is sewed strongly on a top unexpansive portion of the airbag 10A that is close to the rear end of the inflator 5 that is connected to the gas inlet 10c, so as to extend downward approximately perpendicularly to the top edge 10b of the airbag 10A. The airbag support belt 15 is a long and narrow belt formed by laying on each other two pieces of cloth made of the same material as the airbag 10A. In the embodiment, as shown in FIG. 4A, the airbag support belt 15 is composed of a belt main body 15a that is about 30 mm in width and 200 mm in length (as measured from the sewed portion) and a tip fixing portion 15b which is bent from the belt main body 115a so that the airbag support belt 15 is approximately L-shaped as a whole. To integrate the two pieces of cloth together, two reinforcement sewing lines 15c are formed in the longitudinal direction of the airbag support belt 15. Furthermore, as shown in FIG. 4A, an opening 16 which is long in the lateral direction is formed in the airbag support belt 15 at a position that is close to the portion that is sewed on the airbag 10A.

When wound around the outer circumferential surface of the inflator 5, the tip portion of the airbag support belt 15 is caused to pass through the opening 16, whereby the second turn can be wound on the inflator 5 without being shifted laterally. It is preferable that the opening 16 be shaped so as to give only small resistance to the airbag support belt 15 when it is caused to pass through the opening 16. More specifically, taking the ease of positioning and winding work into consideration, it is preferable that the opening 16 have an elliptical or rectangular shape that is short in the longitudinal direction of the airbag support belt 15. To secure its strength, the airbag support belt 15 may be formed by laying on each other three or more pieces of cloth that is made of the same material as the airbag 10A. As a further alternative, the airbag support belt 15 may be may be made of thick (pieces of) cloth. It is even possible to use an elastic material or the like, in which case the airbag support belt 15 can be fastened to the inflator 5 more reliably utilizing it elongation.

A locking hole 17 is formed in the tip fixing portion 15b. After completion of winding of the airbag support belt 15 on the inflator 5, the tip fixing portion 15b can be fixed to the inflator 5 by hooking the locking hole 17 on a locking projection 8 which is provided in the inflator 5. It is preferable that the tip fixing portion 15b be offset from the width range of the belt main body 15a so as not to obstruct work of winding the airbag support belt 15 in plural turns. To this end, in the embodiment, the tip fixing portion 15b is bent from the belt main body 15a and the locking hole 17 is formed in the thus-bent tip fixing portion 15b. Conversely, part of the belt main body 15a may be cut out so that the belt main body 15a can avoid the locking projection 8 when wound on the inflator 5.

Next, a procedure for integrating the inflator 5 with the airbag 10A using the airbag support belt 15 having the above-described structure will be described with reference to FIG. 3A to FIG. 5C.

Figure 2B:
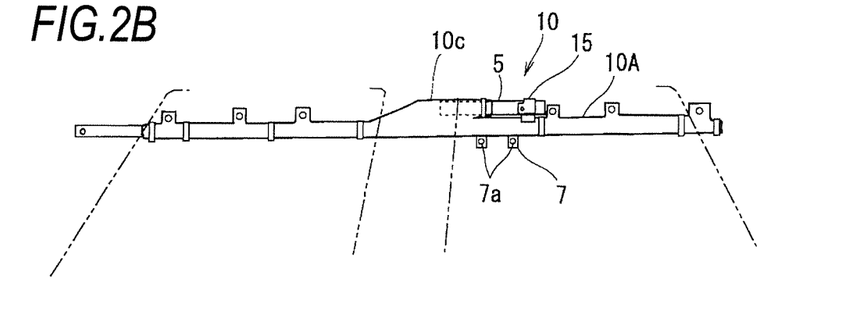
Figures 3A, 3B:
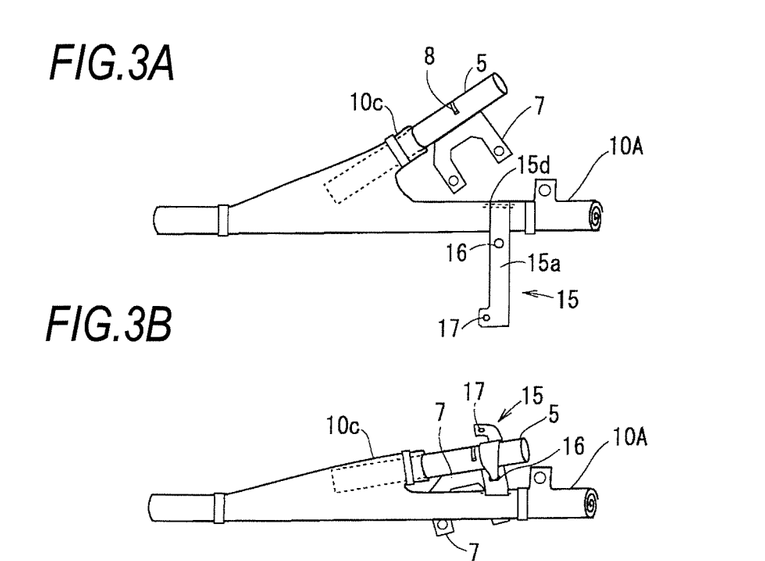
FIGS. 3A, 3B, and 3C are enlarged views showing how an airbag support belt is wound on an inflator.
Figure 3C:
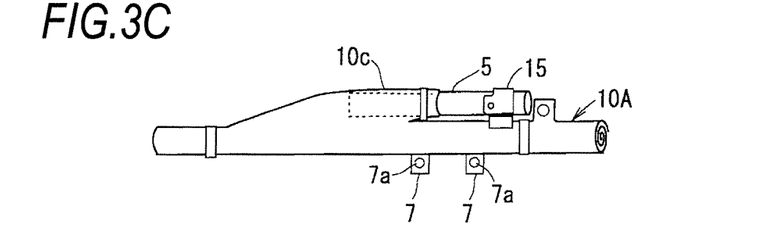

FIGS. 3A and 3C are schematic views as stereographic, enlarged versions of parts, including the inflator 5 and the inflator-attaching portion of the airbag 10A, of FIGS. 2A and 2B, respectively. FIG. 3A shows a state before integration of the inflator 5 and the airbag 10A. In the embodiment, the airbag 10A is folded in roll form except a portion close to the gas inlet 10c because the inflator 5 and a diffuser (not shown) that is attached to the tip of the inflator 5 are inserted in the gas inlet 10c. Therefore, this portion of the airbag 10A is integrated with the inflator 5 by means of the airbag support belt 15. FIG. 3B shows how this portion of the airbag 10A is integrated with the inflator 5 by means of the airbag support belt 15.

Figure 4B:
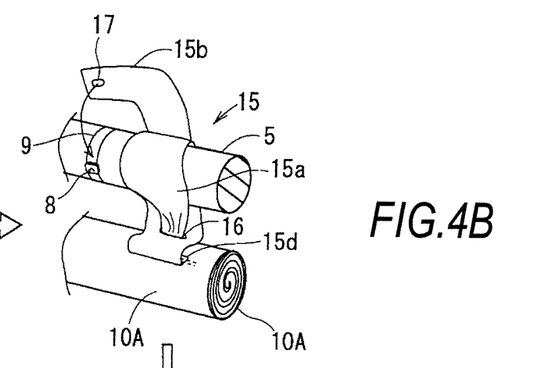

The procedure for integrating the inflator 5 with the airbag 10A using the airbag support belt 15 will be described in a more specific manner with reference to FIGS. 4A, 4B, 4C 5A, 5B and 5C. As shown in FIG. 3A, in the state that the airbag 10A is folded, the inflator 5 extends along the gas inlet 10c of the airbag 10A obliquely away from the folded portion of the airbag 10A. Therefore, the soft gas inlet 10c of the airbag 10A is deformed so as to become approximately parallel with the airbag 10A (see FIG. 4A) and, in this state, the airbag support belt 15 is wound around the inflator 5 (see FIG. 4A). More specifically, as shown in FIGS. 3B and 4B, the airbag support belt 15 is raised above its proximal portion 15d and wound around the circumferential surface of the inflator 5 in one turn in such a manner as to be first laid on that side surface of the inflator 5 which is located on the opposite side to the side where the airbag support belt 15 is attached to the airbag 10A. When the unwound portion of the airbag support belt 15 has returned to below the inflator 5, the tip portion of the airbag support belt 15 is narrowed and inserted through the opening 16 which is located close to the proximal portion 15d and the unwound portion of the airbag support belt 15 is pulled so as to pass through the opening 16. Then, the unwound portion of the airbag support belt 15 is wound on its already wound turn, and the locking hole 17 of the tip fixing portion 15b is hooked on the locking projection 8 of the inflator 5 (see FIG. 4C).

Figure 4C:
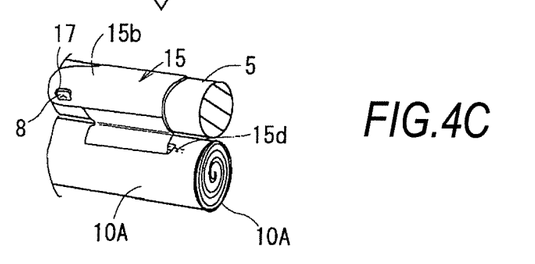
Figure 5A:
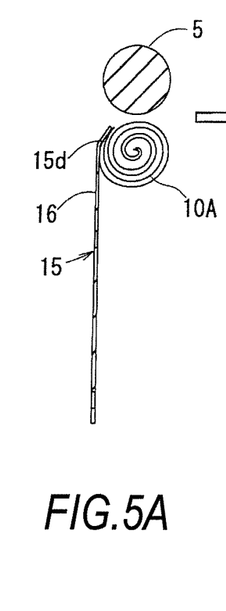
FIGS. 5A, 5B and 5C are sectional views showing how the airbag support belt is wound on the inflator.
Figure 5B:
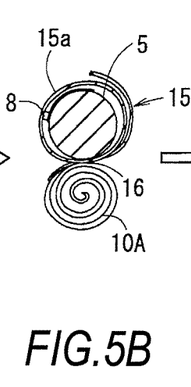
Figure 5C:
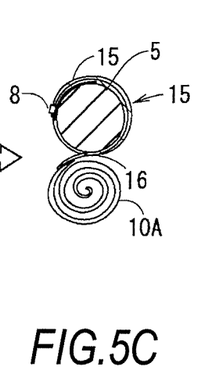

FIGS. 5A, 5B and 5C are schematic sectional views which correspond to FIGS. 4A, 4B and 4C, respectively, and also illustrate how the airbag support belt 15 is integrated with the inflator 5. The relationship between the length of the airbag support belt 15 and the diameter of the inflator 5 can be understood from FIGS. 5A, 5B and 5C. The airbag support belt 15 is bent upward from the state of FIG. 5A and wound around the inflator 5 in one turn in such a manner as to be first laid on that side surface of the inflator 5 which is located on the opposite side to the side where the airbag support belt 15 is attached to the airbag 10A. In this state, the opening 16 of the airbag support belt 15 is located under the inflator 5. The tip portion of the airbag support belt 15 is let pass through the opening 16, and the unwounded portion of the airbag support belt 15 is wound on the inflator 5 as a second turn along the same route as the first turn was wound (see FIG. 5B). Then, the locking hole 17 of the tip fixing portion 15b of the airbag support belt 15 is hooked on the locking projection 8 which is located at approximately the same circumferential position as the tip of the airbag support belt 15 should be located when ½ to ¾ of the second turn has been wound (see FIG. 4C).

As shown in FIGS. 5A, 5B and 5C, by setting the length of the airbag support belt 15 according to the diameter of the inflator 5 and the position of the locking projection 8 formed on its surface, the inflator 5 can be integrated with the folded airbag 10A sufficiently closely (see FIGS. 3C, 4C, and 5C).

More specifically, it is preferable that the length (winding length) of the airbag support belt 15, the longitudinal position of the opening 16 which is located close to the proximal portion 15d, and the longitudinal position and the offset of the locking hole 17 of the tip fixing portion 15b be set taking into consideration the diameter (or outer circumferential length) of the cylindrical inflator used and the position of the locking projection 8. As long as these parameters are set properly, prescribed tension acts on the airbag support belt 15 when the tip fixing portion 15b of the airbag support belt 15 is hooked on the locking projection 8 formed on its surface, the inflator 5, whereby the inflator 5 can be integrated with the airbag 10A closely.

Although in the above embodiment the locking projection 8 is formed on a portion of a clamp band 9 which is attached to the outer circumferential surface of the inflator 5, a portion of the retainer 7 which is attached to the inflator 5 may be provided with a projection-shaped locking member. As a further alternative, the airbag support belt 15 may be fastened to the inflator 5 in a similar manner by forming a locking portion on another kind of fastening member such as a bracket. In any case, it is preferable that the locking hole 17 of the tip fixing portion 15b be formed so as to conform to the shape of the counterpart locking member to prevent the locking hole 17 from coming off easily.

Figure 6A:
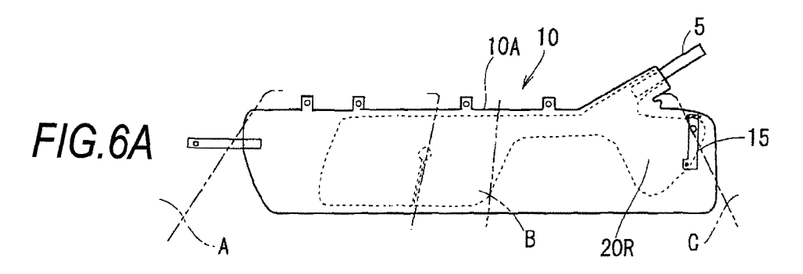
FIGS. 6A, 6B and 6C are schematic front views illustrating embodiments in which the attachment position of the airbag support belt is set differently according to the attachment position where the inflator.
Figure 6B:
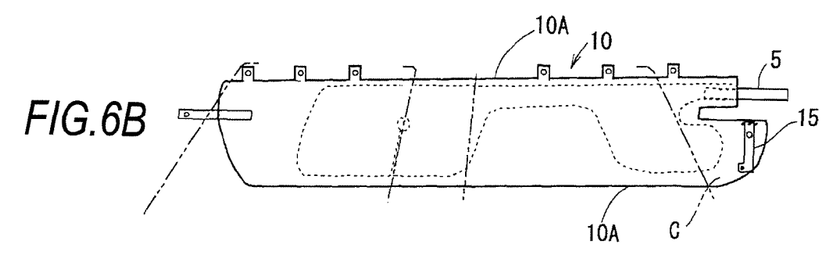
Figure 6C:
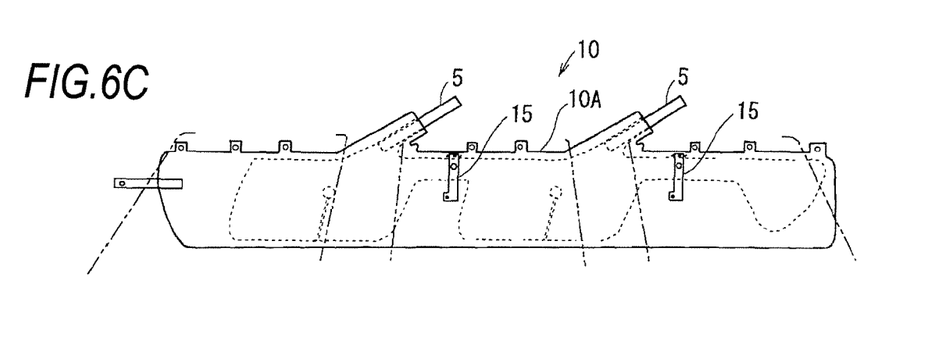

FIGS. 6A, 6B and 6C illustrate embodiments in which the attachment position of the airbag support belt 15 is set differently according to the position where the inflator 5 is attached to the airbag 10A. FIG. 6A illustrates an embodiment in which the gas inlet 10c of the airbag 10A is located between the center pillar B and the rear pillar C. In this case, the attachment position of the airbag support belt 15 is set above the rear seat expansive support portion 20R, whereby the entire rear seat expansive support portion 20R of the airbag 10A is allowed to develop smoothly.

FIG. 6B illustrates an embodiment in which the inflator 5 is attached to a rear end portion of the airbag 10A so as to extend approximately horizontally. This prevents the rear end portion of the airbag 10A from interfering with the rear pillar C when it develops.

FIG. 6C illustrates an embodiment in which the airbag 10A has a three-stage structure and is long in the vehicle front-rear direction. Two inflators 5 are arranged in the front-rear direction. In this case, the relationships between the attachment positions of the two inflators 5 and the positions where two respective airbag support belts 15 are attached to the airbag 10A may be similar to those shown in FIGS. 6A and 6B, respectively.

Whereas in each of the above embodiments the airbag support belt 15 is a separate band-shaped member having a prescribed length which is sewed on the airbag 10A at a prescribed position that is close to its top edge 10b, other attaching means are possible. For example, the airbag support belt 15 may be bonded to a bonding margin, wide enough to secure prescribed bonding strength, of the airbag 10A. Or the airbag support belt 15 may be attached to the airbag 10A using a support piece or any of other attaching means that do not damage the material of the airbag 10A. As a further alternative, the airbag support belt may be formed by cutting the pieces of base cloth of the airbag, in which case the airbag support belt is part of the airbag.

The invention is not limited to the above embodiments, and various modifications are possible without departing from the scope of the claims. That is, the technical scope of the invention encompasses implementations as combinations of technical means that are modified as appropriate without departing from the scope of the claims.

What is claimed is:

1. A head protecting airbag device comprising an airbag (i) in which plural expansive support portions are arranged from a front portion to a rear portion of a vehicle so as to communicate with each other, (ii) which is fixed to and held by a portion of a vehicle body in a folded state so as to extend along a top edge of a side wall of the vehicle and (iii) which develops like a curtain parallel with an inner surface of the side wall of the vehicle while the expansive support portions are expanded by a gas that is introduced from an inflator which operates when a collision is detected or predicted, wherein an airbag support belt is connected to a portion, in close proximity to a top edge of the airbag and close to an attachment position of the inflator, of the airbag, and when the inflator is attached to the airbag in the folded state, the airbag support belt is wound in one or more turns around the inflator in a circumferential direction of the inflator and a tip portion of the wound airbag support belt is fixed to the inflator to thereby cause the inflator to support a part of the folded airbag.

2. The head protecting airbag device according to claim 1, wherein the airbag support belt has an opening, and the airbag support belt is wound in one or more turns around the circumferential surface of the inflator in such a manner that the tip portion of the airbag support belt passes through the opening.

3. The head protecting airbag device according to claim 1, wherein the inflator has a locking unit, and the airbag support belt is fixed to the inflator by locking, on the locking unit, a locking hole which is formed in a tip fixing portion of the airbag support belt.

4. The head protecting airbag device according to claim 2, wherein the inflator has a locking unit, and the airbag support belt is fixed to the inflator by locking, on the locking unit, a locking hole which is formed in a tip fixing portion of the airbag support belt.

5. The head protecting airbag device according to claim 1, wherein a position of an opening in the airbag support belt is set according to a size of the inflator so that tension of the winding of the airbag support belt around the inflator is adjusted.

6. The head protecting airbag device according to claim 2, wherein a position of the opening in the airbag support belt is set according to a size of the inflator so that tension of the winding of the airbag support belt around the inflator is adjusted.

* * * * *